(12) United States Patent
Edpalm et al.

(10) Patent No.: US 7,999,797 B2
(45) Date of Patent: Aug. 16, 2011

(54) DETECTING AND LOCATING A TOUCH OR A TAP ON AN INPUT SURFACE

(75) Inventors: Hanna Mia Selma Edpalm, Stehag (SE); Mats Bornmyr, Malmo (SE)

(73) Assignee: Sony Ericsson Mobile Communications AB, Lund (SE)

(*) Notice: Subject to any disclaimer, the term of this patent is extended or adjusted under 35 U.S.C. 154(b) by 849 days.

(21) Appl. No.: 11/616,095

(22) Filed: Dec. 26, 2006

(65) Prior Publication Data

US 2008/0150902 A1    Jun. 26, 2008

(51) Int. Cl.
*G06F 3/043* (2006.01)
(52) U.S. Cl. ...................................................... 345/177
(58) Field of Classification Search .................. 345/156, 345/173–179; 178/18.01, 18.04
See application file for complete search history.

(56) References Cited

U.S. PATENT DOCUMENTS

| 6,411,284 | B1* | 6/2002 | Junghans | 345/173 |
| 6,933,923 | B2* | 8/2005 | Feinstein | 345/158 |
| 2003/0132922 | A1* | 7/2003 | Philipp | 345/173 |
| 2003/0164820 | A1* | 9/2003 | Kent | 345/177 |
| 2005/0162411 | A1* | 7/2005 | Berkel van | 345/179 |
| 2006/0152499 | A1* | 7/2006 | Roberts | 345/173 |
| 2006/0227119 | A1* | 10/2006 | Hsieh et al. | 345/173 |

FOREIGN PATENT DOCUMENTS

| EP | 0 587 201 A1 | 3/1994 |
| EP | 1 591 873 A2 | 11/2005 |
| EP | 1 645 947 A2 | 4/2006 |

* cited by examiner

*Primary Examiner* — Stephen G Sherman
*Assistant Examiner* — Kenneth Bukowski
(74) *Attorney, Agent, or Firm* — Snyder, Clark, Lesch & Chung, LLP (57) ABSTRACT

A device may receive measurements from an accelerometer in relation to a tap on a surface. The device may process the measurements to obtain a signal that indicates an occurrence of the tap on the surface and may produce the location of the tap based on the processed measurements.

11 Claims, 9 Drawing Sheets

DETECTING AND LOCATING A TOUCH OR A TAP ON AN INPUT SURFACE

TECHNICAL FIELD OF THE INVENTION

Implementations described herein are related to a touch screen or a touch pad, and in particular, pertain to methods and apparatuses for detecting and locating a touch or a tap on an input surface of a display.

DESCRIPTION OF RELATED ART

Touch screens and touch pads have the ability to receive information from a user. They can be used to convey user inputs to hardware and software in place of or in conjunction with devices such a keyboard or a mouse.

SUMMARY

According to one aspect, a method may comprise receiving measurements from an accelerometer in relation to a tap on a surface, processing the measurements to obtain a signal that indicates an occurrence of the tap on the surface, and producing a location of the tap based on the processed measurements.

Additionally, processing the measurements may comprise removing noise.

Additionally, removing noise may comprise removing noise that has low frequency components.

Additionally, producing a location of the tap may comprise comparing reference signals to the obtained signal, selecting a reference signal that best matches the obtained signal, and outputting a location of an input region that is associated with the reference signal.

Additionally, producing a location of the tap may comprise comparing reference signals to the obtained signal, selecting one or more reference signals that best match the obtained signal, and outputting a location of the tap based on input regions that are associated with the reference signals.

Additionally, comparing reference signals to the obtained signal may comprise matching frequency components of at least one of the reference signals to frequency components of the obtained signal.

Additionally, the method may further comprise displaying output images on the surface.

Additionally, producing a location may comprise obtaining a location of an object near the surface from an electric field sensor and outputting the location of the object.

Additionally, outputting the location of the object may comprise outputting the location of the object when it is determined that there is an occurrence of the tap on the surface.

According to another aspect, a device may comprise an input surface and an accelerometer for determining changes in inertia. The device may further comprise a processor to receive sample values from the accelerometer in accordance with the changes in inertia relating to a tap on the input surface, to process the sample values to obtain a signal that indicates an occurrence of the tap on the input surface, and to produce a location of the tap based on the processed sample values.

Additionally, the input surface may comprise one or more input regions and one or more reference signals, each reference signal being associated with one of the one or more input regions.

Additionally, the input surface may comprise one or more input regions that are non-contiguous.

Additionally, the input surface may comprise one or more input regions that are contiguous.

Additionally, the input surface may comprise a surface of a display screen.

Additionally, the sample values may comprise values that indicate vibrations of the input surface.

Additionally, the device may further comprise an electric field sensor that outputs a location of an object that is near the input surface based on changes in an electric field near the input surface and determining the location of the tap based on the location of the object that is near the input surface and based on the signal that indicates the occurrence of the tap.

Additionally, the sample values may comprise values in one, two, or three axes.

According to yet another aspect, a device may comprise means for receiving an input tap and means for generating a signal, which indicates a vibration, based on variations in inertia. The device may further comprise means for processing the signal to obtain a value that denotes an occurrence of the tap on the means for receiving the input tap. The device may further comprise means for locating the input tap on the means for receiving the input tap.

Additionally, the device may further comprise means for generating a location of an object that is near the means for receiving the input tap based on changes in an electric field near the means for receiving the input tap.

Additionally, the means for receiving the input tap may include means for displaying output images.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION OF EMBODIMENTS

The following detailed description refers to the accompanying drawings. The same reference numbers in different drawings may identify the same or similar elements. The terms "touch" and "tap" are interchangeably used herein and they may refer to a contact an object makes against the body of another to cause vibrations on the surface of the body.

Exemplary Device

Touch screens and touch pads can detect a user's tap on their surfaces. In the following implementations, a device with an accelerometer may be used to detect and locate a touch or a tap on its surface.

In one implementation, the accelerometer may detect surface vibrations that are caused by the tap and may generate a signal that characterizes small shifts in inertia. The signal may be processed and analyzed to determine the location of the tap on the surface.

In another implementation, the accelerometer may be used together with an electric field sensor. The accelerometer may detect surface vibrations that are caused by the tap and, in response, may generate a signal that indicates the occurrence of the tap. The electric field sensor may detect and output the location of a nearby object, such as a finger, that produced the tap. The signals from the accelerometer and the electric field sensor may be used to determine the location of the tap on the surface.

Figure 1:
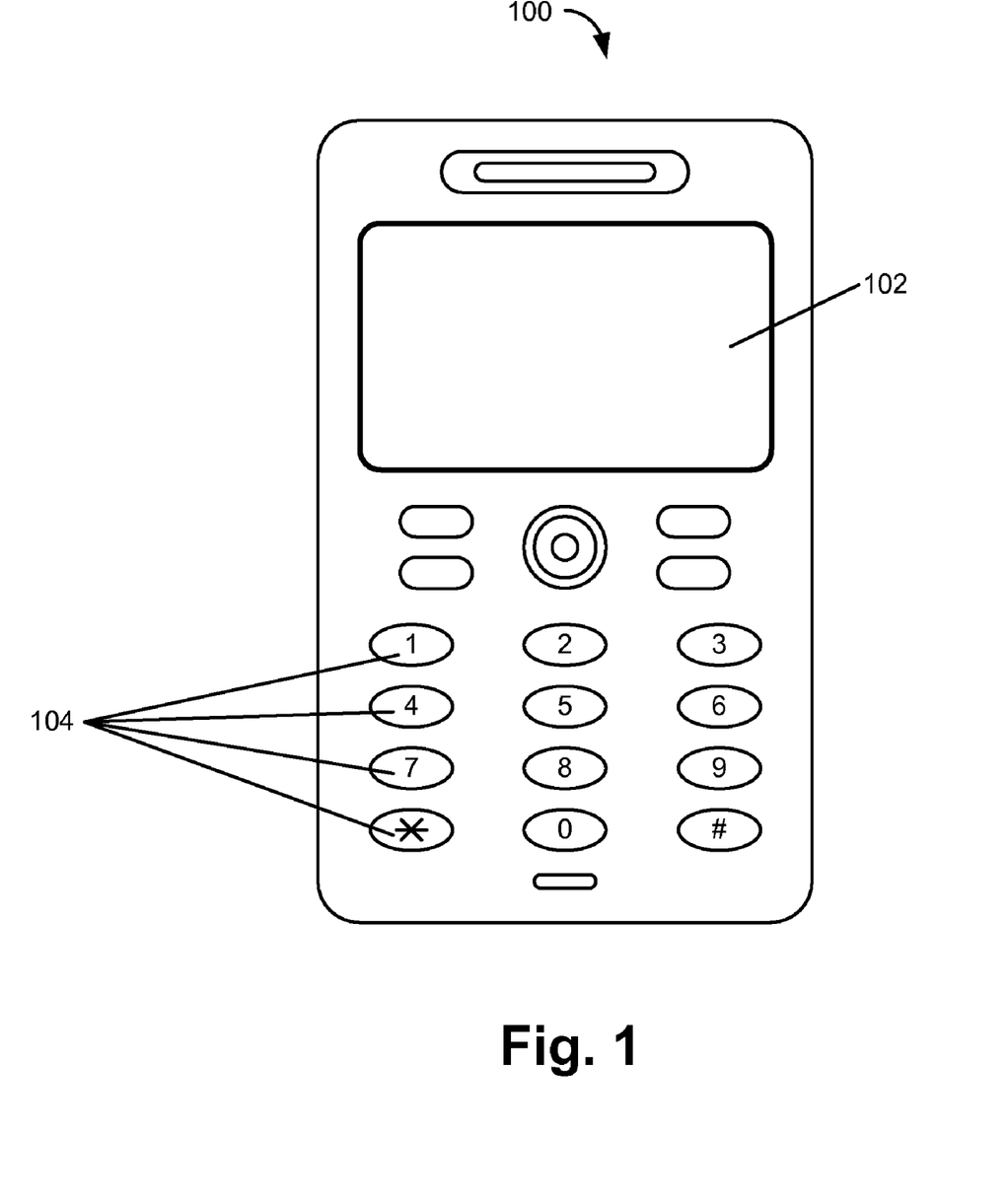
FIG. 1 depicts an exemplary device in which systems and method described herein can be implemented.

FIG. 1 depicts an exemplary device in which systems and methods described herein can be implemented. Device 100 may include any of the following devices that incorporate or are adapted to incorporate one or more input surfaces 102 and 104: a radio telephone; a personal communications system (PCS) terminal that may combine cellular radiotelephone with data processing, facsimile, and data communications capabilities; a mobile telephone; an electronic notepad; a laptop; a personal computer (PC); a personal digital assistant (PDA) that can include a radiotelephone, pager, Internet/intranet access, web browser, organizer, calendar, and/or Global Positioning System (GPS) receiver; or any device with sufficient computing power and memory to support functions described herein.

Figure 2:
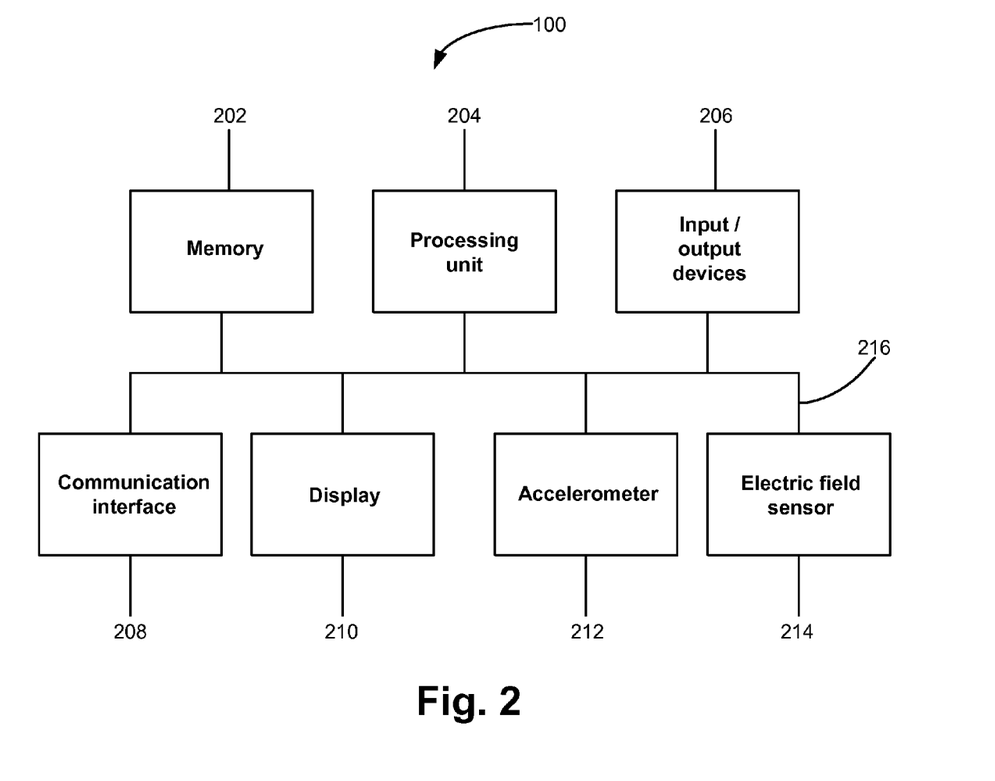
FIG. 2 shows a functional block diagram of the exemplary device of FIG. 1.

FIG. 2 shows a functional block diagram of exemplary device 100. Device 100 may include memory 202, processing unit 204, input/output devices 206, communication interface 208, display screen 210, accelerometer 212, electric field sensor 214, and communication bus 216. Memory 202 may include static memory, such as read only memory (ROM), and/or dynamic memory, such as random access memory (RAM), or onboard cache, for storing data and machine-readable instructions. Memory 202 may also include storage devices, such as a floppy disk, CD ROM, CD read/write (R/W) disc, and/or flash memory, as well as other types of storage devices.

Processing unit 204 may include one or more processors, microprocessors, and/or processing logic capable of controlling device 100. Input/output devices 206 may include a keyboard, mouse, speaker, microphone, digital camera, digital video camera, and/or other types of devices for converting physical events or phenomena to and/or from digital signals that pertain to device 100.

Communication interface 208 may include any transceiver-like mechanism that enables device 100 to communicate with other devices and/or systems. For example, communication interface 208 may include mechanisms for communicating via a network, such as the Internet, a terrestrial wireless network, a satellite-based network, etc. Additionally or alternatively, communication interface 208 may include a modem, an Ethernet interface to a LAN, and/or an interface/connection for connecting device 100 to other devices.

Display screen 210 may include a device that can display signals generated by device 100 as images on a screen and may include a surface for accepting inputs in the form of taps. Examples of a display screen include a liquid crystal display (LCD) screen, cathode ray tube (CRT) display screen, organic light-emitting diode (OLED) display screen, surface-conduction electron-emitter display (SED) screen, plasma display screen, field emission display (FED) screen, and bistable display screen. In practice, device 100 may include one or more display screens.

Accelerometer 212 may include hardware and/or software for determining acceleration and a vibration of device 100. An example of accelerometer 212 may include a micro electro mechanical system (MEMS) accelerometer that is rigidly coupled or anchored to the center of display screen 210, so that accelerometer 212 can detect device vibrations that are generated by taps on the surface of display screen 210 in one, two, or three axes. In other embodiments, it is possible to place accelerometer 212 at other locations and to include more than one accelerometer 212. For example, accelerometer 212 may be fastened to and within device 100 at a position that facilitates the detection of vibrations on input surfaces 104 on or close to buttons of device 100.

Figure 3A:
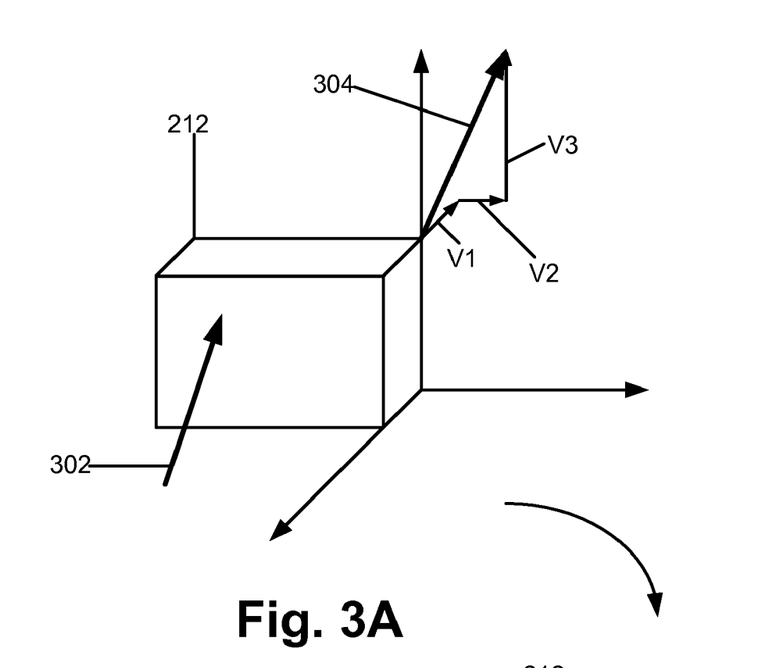
FIG. 3A illustrates a perspective block diagram of an exemplary accelerometer in a three-dimensional Cartesian coordinate system that is affixed to the accelerometer.
Figure 3B:
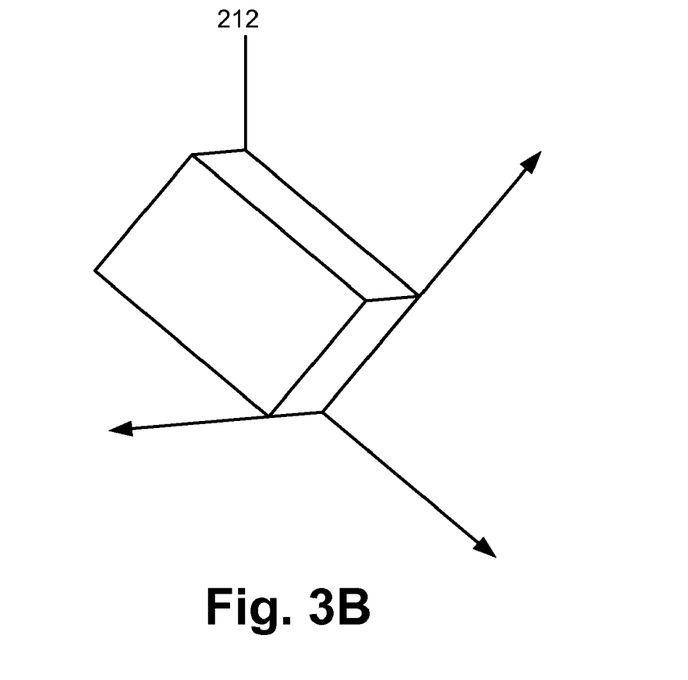
FIG. 3B illustrates the exemplary accelerometer and the coordinate system in FIG. 3A after the accelerometer moves.

Acceleration measurements that are provided by accelerometer 212 may be relative to a coordinate system. FIG. 3A illustrates accelerometer 212 and a three-dimensional Cartesian coordinate system that is affixed to accelerometer 212. If accelerometer moves to a new position or changes its orientation as illustrated in FIG. 3B, the coordinate moves and rotates along with accelerometer 212.

When accelerometer 212 detects the acceleration, accelerometer 212 may output its measurement as three separate values, each of which represents the magnitude of an acceleration component that is parallel to one of the accelerometer axes. For example, if device 100 is held in the orientation as illustrated in FIG. 3A, when it is tapped with force 302, the device may move or vibrate in the direction as shown by arrow 304. Accelerometer 212 may decompose the acceleration into components V1, V2 and V3 and may output the magnitudes of V1, V2 and V3.

Referring back to FIG. 2, electric field sensor 214 may include hardware and/or software for determining the location of a nearby object, such as a finger or a stylus. Electric field sensor 214 may overlay the entire display screen 210 surface for generating an electric field at the surface and for locating changes in its capacitance and the electric field when the object is close to display screen 210.

Figure 4:
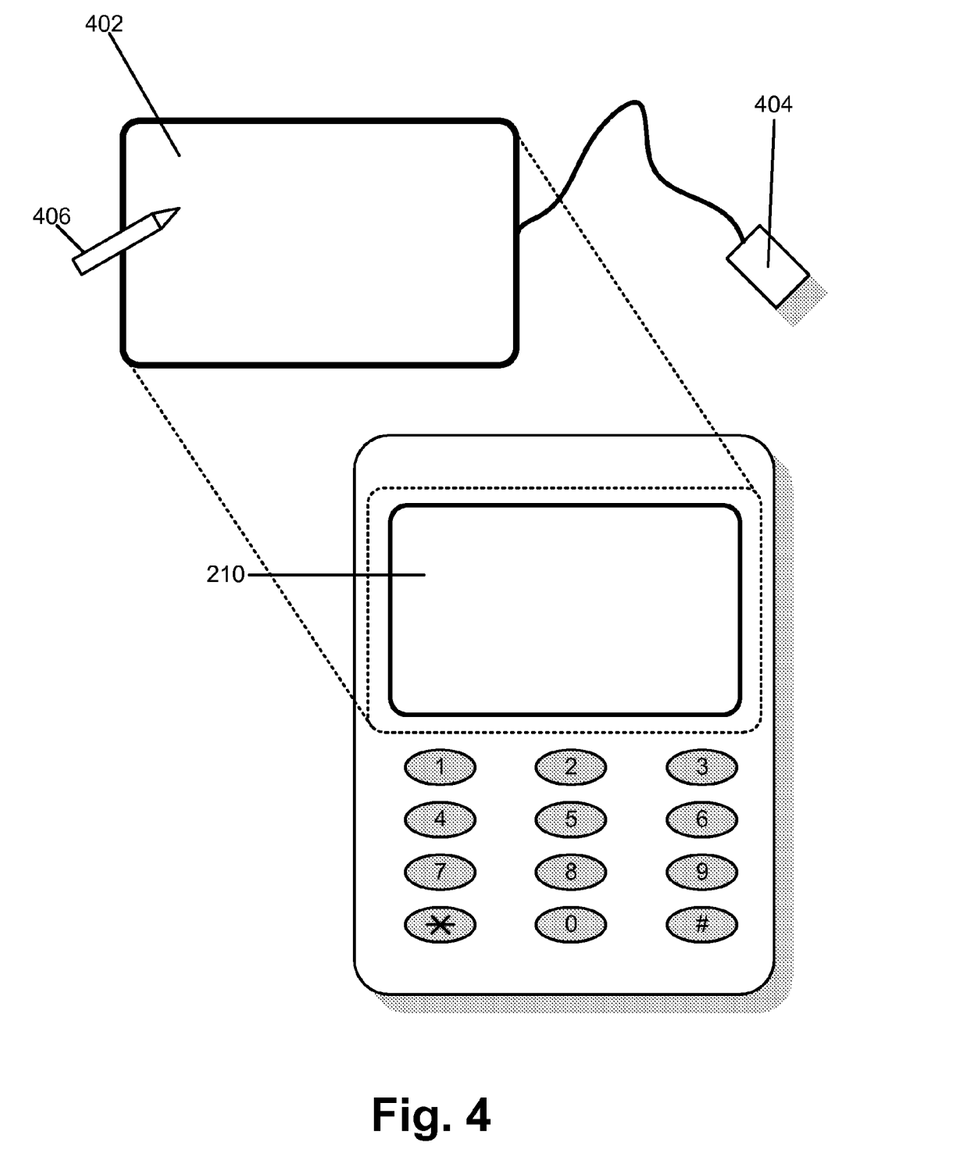
FIG. 4 shows a functional block diagram of an exemplary electric field sensor.

FIG. 4 shows a functional block diagram of an electric field sensor 214. Electric field sensor 214 may include transparent panel 402 and processing unit 404. Transparent panel 402 may overlay display screen 210, as shown in a dotted rectangle, but may still allow images on display screen 210 to be viewed. Further, transparent panel 402 may generate an electric field at its surface and detect changes in capacitance and the electric field on its surface due to a nearby object, such as a finger (not shown) or a stylus 406. Processing unit 404 reads outputs of transparent panel 402 and uses the outputs to generate the location of disturbances in the electric field, and thus of the object.

Referring back to FIG. 2, communication bus 216 may provide an interface through which components of device 100 can communicate with one another.

Figure 5A:
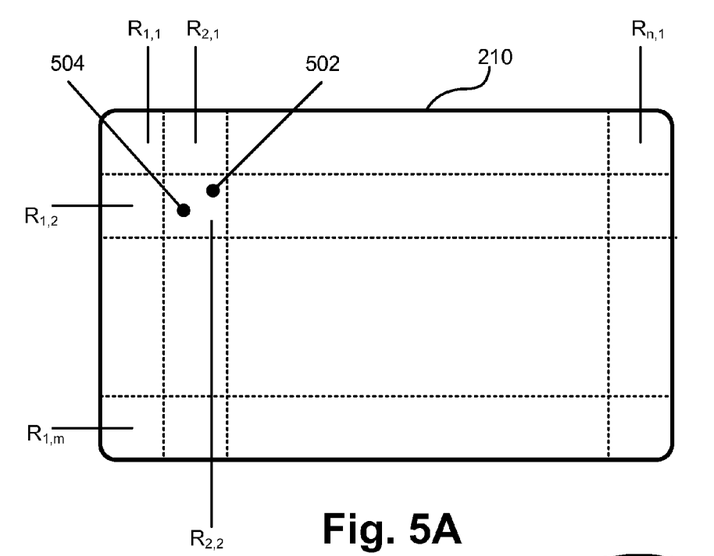
FIG. 5A illustrates a block diagram of a display screen with exemplary input regions.

FIG. 5A illustrates a display screen 210 with m×n input regions, $R_{1,1}$, $R_{2,1}$, $R_{n,1}$, $R_{1,2}$, ... $R_{n,2}$, $R_{2,2}$, ... $R_{n,2}$, ... and $R_{n,m}$, where m and n are integers greater than or equal to one. An "input region" as used herein, may be defined as the smallest unit of surface area that may be identified as having received a touch or a tap. Thus, for example, if a user taps point 502 and point 504, user inputs may be deemed to originate from input region $R_{2,2}$. In FIG. 5A, while the regions are illustrated as rectangular areas that cover display screen 210, the regions in general may have circular, hexagonal, elliptical, or any suitable geometrical shape and they may be non-contiguous. For example, in FIG. 5B, input regions 506 are shown as non-contiguous ellipses that are on the surface of housing 508 of a cell phone 510. In many implementations, the input regions may be on a touch pad, a keyboard, a display screen that is plugged into a computer, or any rigid surface that may convey vibrations when it is tapped.

Each input region in FIG. 5A may be associated with a reference signal that represents a typical surface vibration of the region when it is touched or tapped. Because the surface tensional forces of each input region in equilibrium are different from those in other regions, the frequencies of a vibration resulting from a tap in one region are different from those in other regions. Consequently, the reference signal for an input region may be used to characterize the region.

Each reference signal may be obtained, during the design, construction and/or input calibration of device 100, by processing the outputs of accelerometer 212 in response to touches or taps within the corresponding region. The reference signals thus obtained may be stored in memory 202 in any suitable form, such as a table.

If device 100 includes multiple accelerometers 212, each accelerometer 212 may be associated with a set of input regions, and therefore, with a set of reference signals. A set of regions for one accelerometer 212 may or may not overlap a set of regions for another accelerometer 212. In addition, each input region may be associated with reference signals that are stored in memory for different types of input objects. For example, memory 202 may contain reference signals for a rigid object, such as a stylus, that can generate a signal with a relatively small damping constant when it taps on display screen 210. In addition, memory 202 may contain reference signals for a soft object, such as a finger, that can generate a signal with a relatively large damping constant when it taps on display screen 210.

Figure 5B:
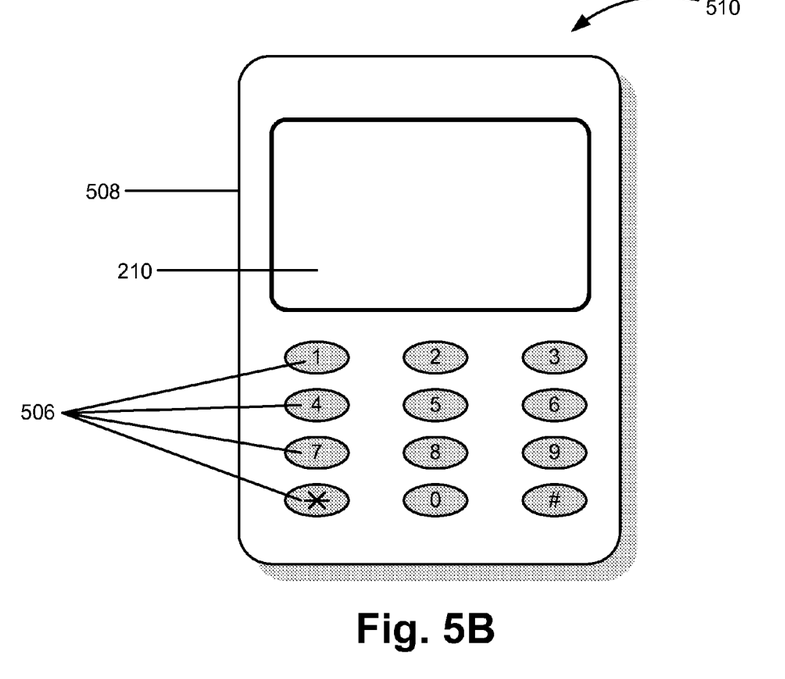
FIG. 5B illustrates a diagram of exemplary input regions that are elliptical and non-contiguous.

In many implementations, the number of input regions for different implementations may depend on several design considerations. In one implementation, as illustrated in FIG. 5B, the number of input regions may depend on the number of mechanical components the regions may replace. FIG. 5B shows twelve input regions, each region corresponding to a button that is eliminated. In such an implementation, many mechanical components associated with buttons and metal contacts may be eliminated to reduce the costs related to the device construction.

In other implementations, the number of input regions may depend on the cost and benefits associated with having a large number of input regions. For example, increasing the number of input regions may increase the resolution of the location of a tap. However, increasing the number of input regions can also increase the computational cost associated with manipulating the reference signals. In addition, more regions require more reference signals to be stored and, therefore, require more memory utilization. Further, as regions become smaller, a reference signal may become indistinguishable from those of neighboring regions and may no longer characterize its region.

Exemplary Process for Locating an Input Tap

Figure 6A:
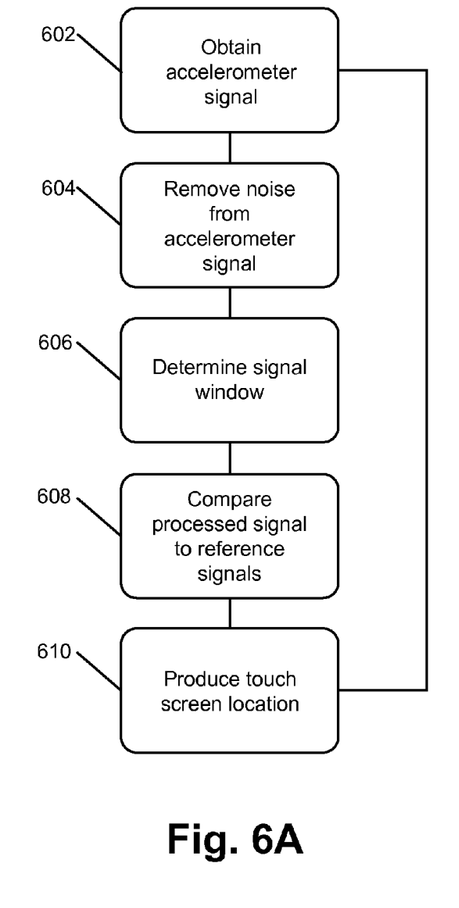
FIG. 6A shows an exemplary process for detecting and locating a tap on a display screen.

FIG. 6A shows an exemplary process for detecting and locating a tap on display screen 210. At block 602, a signal from accelerometer 212 may be obtained. While the signal may include three signal components, each for one of three axes, only one signal component is discussed in the following for the sake of simplicity.

The signal may include a series of sample values of acceleration within a time window of a given duration. The samples may be selected from memory 212, which may temporarily buffer the measured values that are received from accelerometer 212.

At block 604, the signal may be processed to remove noise. Removing the noise may involve filtering out minute variations in acceleration, for example, due to thermal noise of accelerometer 212, that are at much higher frequencies than those related to surface vibrations of display screen 210. In addition, removing noise may involve filtering out low frequency components associated with large device motions. For example, if device 100 includes a cell phone, it may be placed in a purse, hand, or pocket whose acceleration varies along with the movements of the phone carrier. Such slow changing acceleration component of the signal may be removed through filtering.

Many techniques may be employed to filter the noise. For example, Discrete Fourier Transform (DFT) may be applied to the signal to obtain the frequency domain representation, after which a digital band-pass filter may be applied to remove the noise in high frequency and low frequency bands.

Figure 7A:
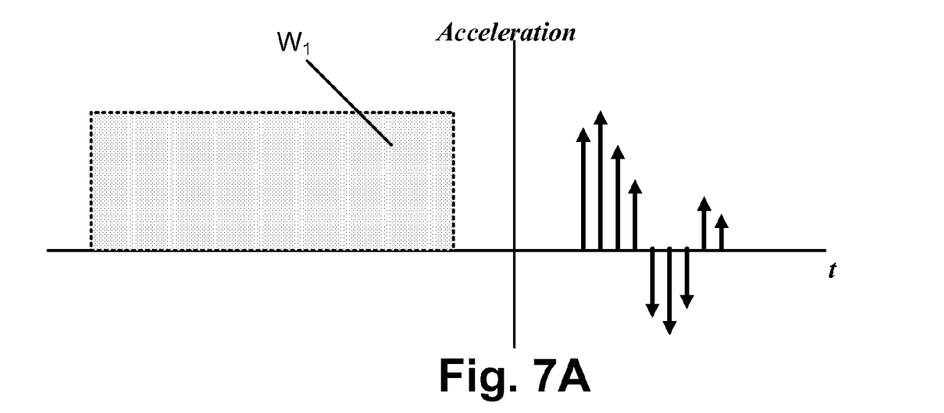
FIGS. 7A-7C illustrate an exemplary filtered signal that is in three different time windows.
Figure 7B:
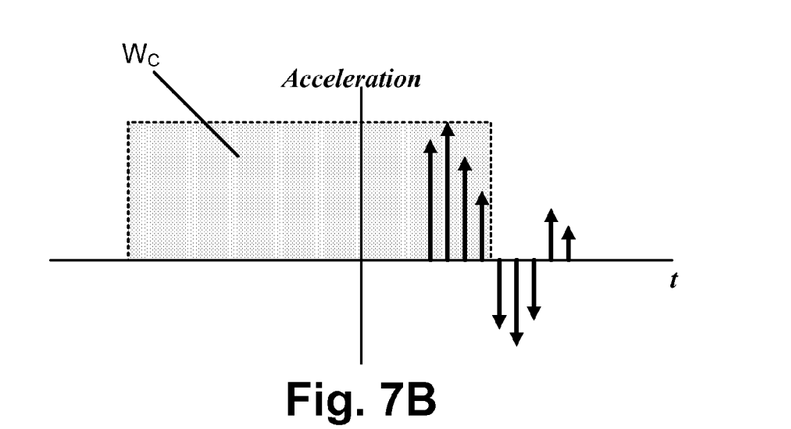
Figure 7C:
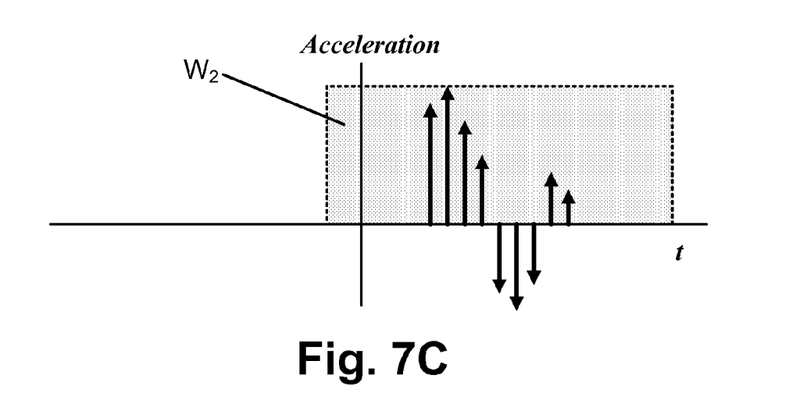

At block 606, the filtered signal may be processed to determine a signal window that contains the tap. In one implementation, a sliding window technique may be used to determine the window that contains the tap. For example, as illustrated in FIGS. 7A, 7B, and 7C, the signal may be framed in three time windows, $W_1$, $W_C$, and $W_2$. Each window is time shifted from other windows by more than the expected duration of the signal. The signal energies in time windows $W_1$, $W_C$, and $W_2$ may be computed and compared to each other. The window that has the greatest signal energy may be determined as the new signal window, $W_C$.

If none of the windows contains more signal energy than a predetermined threshold level that indicates the presence of a tap, none of the windows may be deemed to contain the tap. In such an instance, the process may return to block 602 in order to obtain a new set of samples in new time windows $W_1$, $W_C$, and $W_2$, with the new $W_C$ contiguous to the old $W_C$.

If a tap is deemed to be present, at block 608, the screen regions whose reference signals best match the processed signal may be determined through various signal processing techniques. For example, in one implementation, a matched filter may be employed. A matched filter may involve, for each reference signal, computing the product of the processed signal and the reference signal. The products of the computations may be ranked in a list in accordance with the magnitudes of their spectral energies. The top N items in the list, where N is an integer greater than one, may be selected as the regions whose reference signals that best match the processed signal.

At block 610, the selected regions may be used to estimate the location of the tap. For example, if a signal matches reference signals from four adjacent regions, the location of the touch or the tap may be computed by applying interpolative techniques to the selected regions. The determined location of the tap or the touch may be conveyed to a software program or a hardware component in device 100 as part of a user input.

The process illustrated in FIG. 6A may be repeated to continuously obtain locations of taps and touches.

Alternative Implementation

Figure 6B:
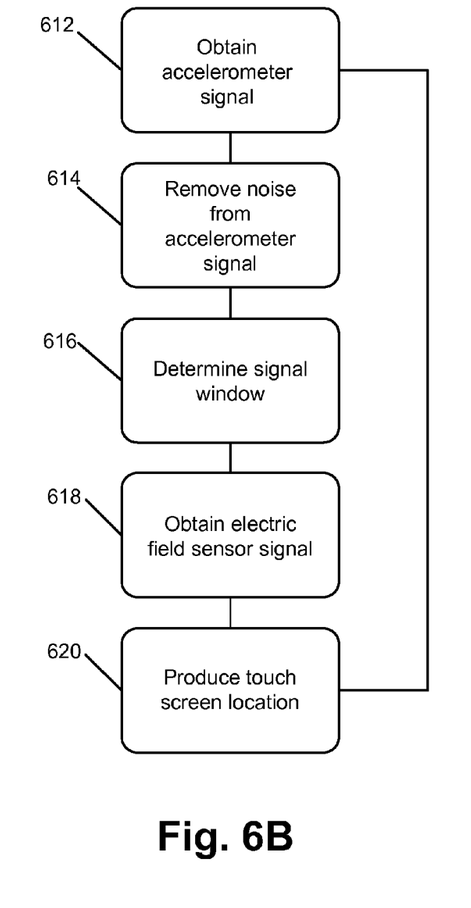
FIG. 6B shows another exemplary process for detecting and locating a tap on the display screen.

FIG. 6B shows another exemplary process for detecting and locating a tap on display screen 210. At block 612 in FIG. 6B, a signal from accelerometer 212 may be obtained.

At block 614 and block 616, the obtained signal may be processed in a manner similar to those at block 604 and block 606 to remove noise and to capture the time window that contains a tap. If, at block 616, the processed signal contains a tap, a signal from electric field sensor 214 may be obtained at block 618. Otherwise, the process may return to block 612 in order to obtain a new set of samples from accelerometer 212.

At block 618, the signal from electric field sensor 214 may be obtained in the form of location information. The determined location of the tap may be conveyed to a software program or a hardware component in device 100 as part of user input.

The process illustrated in FIG. 6B may be repeated to continuously obtain locations of taps and touches.

Example

The following example illustrates processes involved in detecting a tap on an input surface, with reference to FIG. 5B, FIGS. 7A-7C, FIGS. 8A-8D, and FIG. 9A-9C. In the figures that illustrate signals in the DFT frequency domain, only non-repeating portions of the signals in the non-negative part of the domain are shown.

Figure 8A:
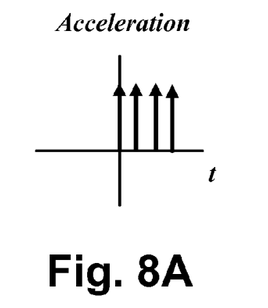
FIG. 8A depicts an exemplary signal that is obtained from accelerometer.

Assume that a user power up phone 510 that is shown in FIG. 5B. After powering up, the user taps on the input region 506 that represents #1 button. A signal from the accelerometer inside device 510 is obtained. FIG. 8A illustrates the signal.

Figure 8B:
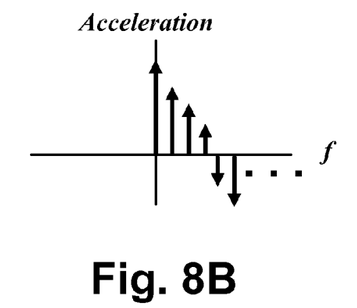
FIG. 8B depicts the exemplary signal of FIG. 8A in the Discrete Fourier Transform (DFT) frequency domain.
Figure 8C:
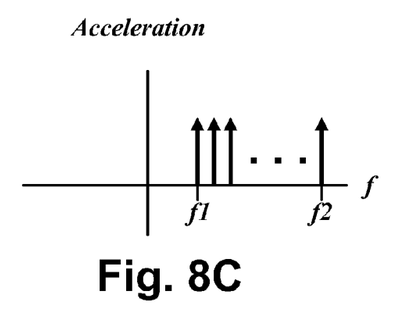
FIG. 8C depicts frequency characteristics of an exemplary band-pass filter in the DFT frequency domain.
Figure 8D:
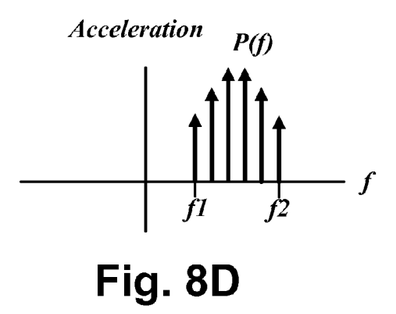
FIG. 8D depicts the resulting signal in the DFT frequency domain after the exemplary signal in FIG. 8B has been filtered with the band-pass filter in FIG. 8C.

To remove noise, the DFT is first applied to the signal to obtain its frequency domain representation, which is shown in FIG. 8B. The signal is then fed through a digital band-pass filter, whose frequency characteristic is illustrated in FIG. 8C, with cut-off frequencies at f1 and f2. FIG. 8D shows the resulting signal P(f) after passing the signal in FIG. 8A through the filter in FIG. 8C.

The filtered signal may be processed to determine the signal window that contains the tap. Assuming that the filtered signal of FIG. 8D in the DFT frequency domain corresponds to the signal of FIG. 7A in the time domain, a sliding window technique may be used to determine the window that contains the tap. Of the three windows, $W_1$, $W_C$, and $W_2$, $W_2$ contains the largest portion of the signal, and therefore, is determined as the new signal window, $W_C$. In addition, the signal energy is computed by multiplying each of the signal sample values with its complex conjugate and by summing up all the multiplied values. The result, denoted as $E_0$, is compared to a predetermined threshold $E_T$. In this example, it is assumed that $E_0$ is greater than $E_T$, and thus, $E_0$ indicates the presence of a tap.

Figure 9A:
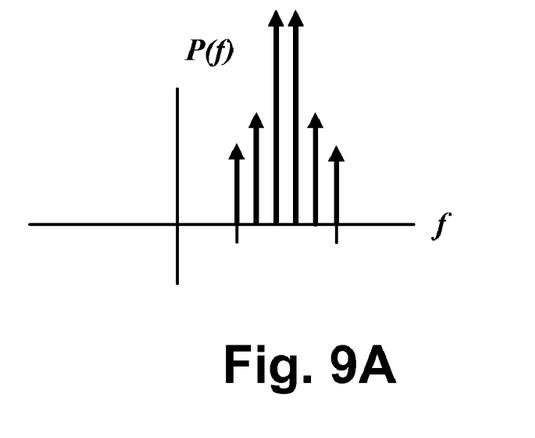
FIG. 9A shows an exemplary reference signal in the DFT frequency domain for an input region in FIG. 5B.
Figure 9B:
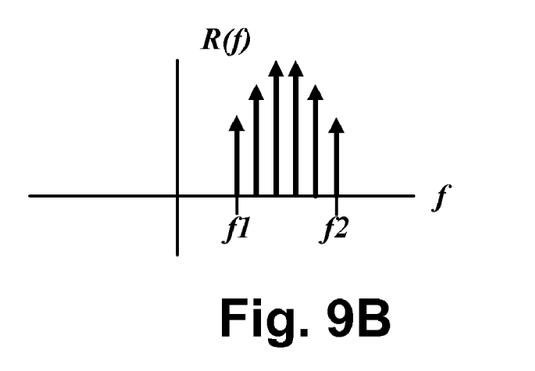
FIG. 9B re-illustrates the filtered signal in FIG. 8D.

To determine the region that contains the tap, DFT of each reference signal is multiplied, in the DFT frequency domain, to the filtered signal illustrated in FIG. 8D, and for each reference signal, the spectral energy of the resulting product is determined. For example, FIGS. 9A, 9B, and 9C illustrate respectively, in DFT frequency domain, the reference signal R(f) that is associated with #1 button in FIG. 5B, the filtered signal P(f) in FIG. 8D, and the multiplied product of the reference signal and the filtered signal.

Figure 9C:
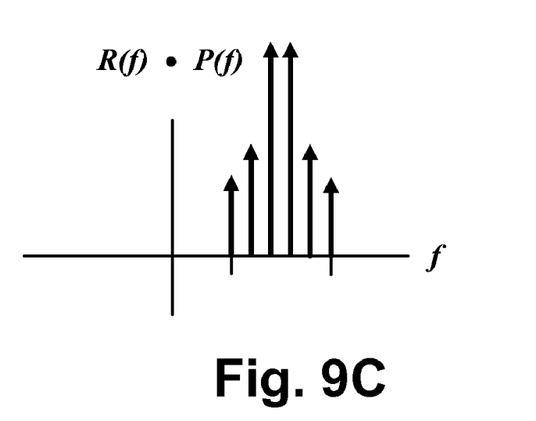
FIG. 9C shows in the DFT frequency domain the multiplied product of the exemplary reference signal of FIG. 9A and the filtered signal of FIG. 9B.

In this example, it is assumed that the energy of the signal in FIG. 9C is greater than the energies for the products of the filtered signal and other reference signals. Thus, based on the spectral energies, #1 button is determined as the input region that contains the tap. Its location is conveyed to a software program that is to process the user input.

Conclusion

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 6A and 6B, the order of the blocks may be modified in other implementations. For example, block 604/614 may be performed before block 606/616, depending on the captured signal's signal-to-noise ratio. Further, non-dependent blocks may represent acts that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
receiving, by at least one processor in a device, vibration measurements from an accelerometer in relation to a tap, on one of plurality of input regions of the device, by an object that includes one of a deformable object or a non-deformable object;

processing, by at least one processor in the device, the vibration measurements to obtain a vibration signal corresponding to the vibration measurements from the tap, where processing the vibration measurements includes removing noise, where removing the noise includes removing portions of the noise that include low frequency components;

producing, by at least one processor in the device, a location of the tap, where producing the location of tap comprises:

comparing the vibration signal to a plurality of vibration reference signals, where pairs of the plurality of vibration reference signals are associated, respectively, with a prior tap at one of a plurality of input regions of the device, where one of a pair of the plurality of vibration reference signals is associated with contact, by the deformable object, in the associated one of the plurality of input regions and another one of the pair of the plurality of vibration reference signals is associated with contact, by the non-deformable object, in the associated one of the plurality of input regions, selecting, based on comparing the vibration signal to the plurality of vibration reference signals, two or more of the plurality of input regions, obtaining, by an electric field sensor in the device, a position of the object near the device, and determining the location of the tap based on the obtained position of the object and the selected two or more of the plurality of input regions; and storing, by at least one processor in the device, the location of the tap.

2. The method as in claim 1, where comparing the obtained vibration signal to the plurality of vibration reference signals comprises:

matching frequency components of at least one of the plurality of vibration reference signals to frequency components of the obtained vibration signal.

3. The method as in claim 1, further comprising:

displaying output images on a surface that includes the plurality of input regions.

4. The method as in claim 1, where obtaining the position of the object occurs in response to determining an occurrence of the tap based on receiving the vibration measurements.

5. A device comprising:

an input surface, where the input surface comprises a plurality of input regions, where a respective pair, of a plurality of reference signals, is associated with each of the plurality of input regions;

an electric field sensor that overlays the input surface, the electric field sensor to:

detect changes in an electric field near the input surface, and output, based on the detected changes in the electric field, a position of an object that is near the input surface, where the object is one of a deformable object or an non-deformable object, where, for each of the plurality of input regions, one of the respective pair, of the plurality of reference signals, is associated with contact at one of the plurality of input regions by the deformable object and another of the respective pair is associated with contact at the one of the plurality of input regions by the non-deformable object;

an accelerometer to determine changes in inertia of the device; and a processor to:

receive sample vibration values from the accelerometer, where the sample vibration values correspond to changes in inertia of the device relating to a tap on the input surface by the object, process the sample vibration values to obtain a signal that indicates an occurrence of the tap on the input surface, where the sample values comprise values that indicate vibrations of the input surface from the tap, where the processor, when processing the vibration sample values, is to remove noise, and where the processor, when removing the noise, is to remove portions of the noise that include low frequency components, and where the processor, when processing the sample values, is further to:

compare the obtained signal to the plurality of reference signals, select based on comparing the obtained signal to the plurality of reference signals, two or more of the plurality of input regions, and produce a location of the tap based on the selected two or more of the plurality of input regions and the outputted position of the object.

6. The device as in claim 5, where the plurality of input regions are non-contiguous.

7. The device as in claim 5, where the plurality of input regions are contiguous.

8. The device as in claim 5, where the input surface comprises:

a surface of a display screen.

9. The device as in claim 5, where the sample values comprise measurement values in at least one of one axis, two axes, or three axes.

10. A device comprising:

means for receiving an input tap by an object;

means for storing a plurality of references signals that correspond to previously received input taps in, respectively, portions of the means for receiving the input tap;

means for generating a position of the object relative to the means for receiving the input tap based on changes in an electric field near the means for receiving the input tap;

means for generating a signal, which indicates a vibration, based on variations in inertia, where the means for generating the signal includes:

means for removing noise, where the means for removing noise include means for removing portions of the noise that include low frequency components;

means for identifying two or more of the portions of the means for receiving the input tap, where the identified two or more portions of the means for receiving the input tap correspond, respectively, to two or more the plurality of reference signals that best match the generated signal;

means for processing the reference signal to obtain a value that denotes an occurrence of the input tap on the means for receiving the input tap; and means for locating the input tap on the means for receiving the input tap based on the identified two or more of the plurality of means for receiving the input tap, the value that denotes the occurrence of the input tap, and the position of the object relative to the means for receiving the input tap.

11. The device as in claim 10, where the means for receiving the input tap includes means for displaying output images.

* * * * *